United States Patent [19]

Hoenel et al.

[11] Patent Number: 5,677,006
[45] Date of Patent: Oct. 14, 1997

[54] LIQUID TWO-COMPONENT COATING COMPOSITIONS

[75] Inventors: Michael Hoenel; Armin Pfeil, both of Wiesbaden; Thomas Budnick, Essen; Heiner Schwan, Wuppertal, all of Germany

[73] Assignee: Hoechst Aktiengesellschaft, Frankfurt, Germany

[21] Appl. No.: 457,111

[22] Filed: Jun. 1, 1995

Related U.S. Application Data

[62] Division of Ser. No. 358,744, Dec. 19, 1994, abandoned.

[30] Foreign Application Priority Data

Dec. 24, 1993 [DE] Germany ............... 43 44 510.1

[51] Int. Cl.$^6$ ............... B32B 27/38; C08K 3/20; C08C 61/20
[52] U.S. Cl. ............... 427/372.2; 428/423.1; 428/413; 523/403; 523/414; 523/415; 525/504; 525/507; 525/523; 525/524
[58] Field of Search ............... 523/414, 415, 523/403; 525/504, 523, 507, 524; 528/93, 111, 120, 368, 393, 121; 428/413, 414, 423.1; 427/372.2

[56] References Cited

U.S. PATENT DOCUMENTS

| | | | |
|---|---|---|---|
| 3,870,666 | 3/1975 | Becker | 260/21 |
| 4,122,069 | 10/1978 | Meyer | 525/523 |
| 4,197,389 | 4/1980 | Becker et al. | 528/103 |
| 4,806,611 | 2/1989 | Honel et al. | 528/45 |
| 4,808,658 | 2/1989 | Walz et al. | 524/591 |
| 4,835,289 | 5/1989 | Brindoepke | 549/229 |
| 4,886,845 | 12/1989 | Becker et al. | 523/403 |
| 4,892,954 | 1/1990 | Brindoepke et al. | 549/229 |
| 5,075,370 | 12/1991 | Kubitza et al. | 524/591 |
| 5,235,007 | 8/1993 | Alexander et al. | 525/523 |
| 5,369,190 | 11/1994 | Honig et al. | 525/433 |

FOREIGN PATENT DOCUMENTS

| | | |
|---|---|---|
| 2073814 | 1/1993 | Canada. |
| 43 10 198 | 10/1994 | Germany. |
| 84/03701 | 9/1984 | WIPO. |

*Primary Examiner*—Randy Gulakowski
*Attorney, Agent, or Firm*—Foley & Lardner

[57] ABSTRACT

This invention relates to coating compositions including one or more resins having amino-reactive groups; one or more polyamine curing agents; and one or more aminourethanes. The aminourethanes can be reaction products of (i) oligomeric or polymeric compounds which contain at least one, preferably two or more terminal 2-oxo-1,3-dioxolane groups (cyclic carbonate groups), and (ii) amines containing at least one primary, preferably two or more primary and, if desired, also secondary and tertiary amino groups. The ratios of equivalents of C1):C2) typically is from 1:1 to 1:10, preferably from 1:1.05 to 1:5 and particularly preferably from 1:1.1 to 1:2, and the end product preferably contains one or more free primary amino groups. The composition further may contain, if desired, pigments, fillers, one or more organic solvents, water and conventional additives.

4 Claims, No Drawings

LIQUID TWO-COMPONENT COATING COMPOSITIONS

This application is a division of application Ser. No. 08/358,744, filed Dec. 19, 1994 now abandoned.

BACKGROUND OF THE INVENTION

1. Field of the Invention

The invention relates to liquid two-component coating compositions based on amino-reactive resins, polyamine curing agents and aminourethanes. The coating compositions are useful in the coating of a wide variety of articles, especially in industrial coatings, automotive finishing and the coating of automotive components.

2. Description of Related Art

Because of environmental regulations, which are becoming more and more stringent, aqueous systems are gaining increasing importance for use in coating articles. In terms of their properties, they must be measured against conventional, i.e. solvent-containing systems. In this context, water-dilutable epoxy resin systems have gained importance among cold-curing water-based coating systems. These two-component systems have outstanding properties. The following positive properties are to be emphasized: little or no solvent content, not a fire hazard, little or no odor, ease of processing, low degree of sensitivity toward moist substrates, good drying and rapid through-hardening, excellent adhesion to most substrates, very good intercoat adhesion, good protection of metals against corrosion, and easy cleaning of equipment directly after use.

Nonionically dispersed epoxy resin systems, as described in DE-A 3 643 751, together with aqueous amine-based curing agents specified in EP-A 0 000 605, exhibit these outstanding properties and can therefore be used in a versatile manner as coating compositions. The disclosure of these documents and all other documents mentioned herein are incorporated herein by reference in their entirety. A disadvantage of these systems, however, is that they do not produce defect-free surfaces in certain applications.

EP-A 0 523 610 describes aqueous two-component systems based on epoxy/amines, which overcome the above-mentioned disadvantage by the addition of water-soluble or water-dilutable polyurethane resins. The system described in this document also brings about a high surface quality. These systems are intended to be used primarily in automotive refinishing. The disadvantage of these coatings, which are in particular fillers and primers, however, is that they have an inadequate sandability after a short drying time. Such systems are in general much too soft and, because of the pronounced thermoplasticity, after a short time the sand paper exerts a severe effect and the surface is damaged.

EP-A 0 234 395 describes aminourethane resins which are obtained by reacting carbonates with compounds having primary amino groups and further basic groups. Because of the incorporation of, for example, partially blocked polyisocyanates, these resins may be self-curing. However, it also is possible to add to the aminourethanes a curing agent which is conventional for coating systems which crosslink by means of external agents, for example, blocked polyisocyanates, β-hydroxy esters of at least difunctional polycarboxylic acids, transesterification curing agents or Michael addition products. The aminourethanes are preferably employed, after at least partial neutralization, as resins for electrodeposition coating. There is only a very general indication that the aminourethane resins can also be employed in, preferably nonaqueous, coating systems containing epoxy resin. More precise details of the composition, use and properties of these coating systems are not given.

SUMMARY OF THE INVENTION

It is therefore an object of the invention to provide polyamine-crosslinking coating compositions which can be cured at room temperature, which have a very good surface quality and which, after a short drying time, can be dry- or wet-sanded and which also show in thin layers a good adhesion to the substrate.

In accordance with these objectives, there is provided a two-component coating composition which can be curable at room temperature, comprising
(A) one or more resins having amino-reactive functional groups;
(B) one or more polyamine curing agents;
(C) one or more aminourethanes which are reaction products of;
  (C1) oligomeric or polymeric compounds containing at least one, preferably two or more terminal 2-oxo-1,3-dioxolane groups; and
  (C2) amines containing at least one primary, preferably two or more primary and, if desired, also secondary and tertiary amino groups; and
(D) optionally, pigments, fillers, solvents, water and conventional additives, and in which the ratios of numbers of functional groups in C1 and C2, i.e. 2-oxo-1,3-dioxolane groups to primary amino groups, are from 1:1 to 1:10, preferably from 1:1.05 to 1:5 and particularly preferably from 1:1.1 to 1:2.

In accordance with an additional object of the invention there are provided aqueous coating compositions which comprise water-soluble or water-dilutable epoxy resins and water-soluble or water-dilutable polyamine curing agents. These and other objects of the invention will be readily apparent to those skilled in the art upon review of the detailed description of the invention that follows.

DETAILED DESCRIPTION OF THE PREFERRED EMBODIMENTS

The ratio of numbers of functional groups of polyamine curing agents (B): aminourethane (C) is generally from 5:95 to 95:5. The ratio preferably is from 20:80 to 80:20 and particularly preferably from 30:70 to 70:30.

The polyamines useful as components (C2) preferably have the formula

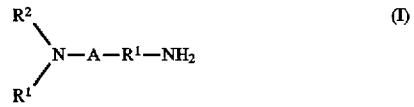

in which $R^1$ is a divalent hydrocarbon radical, preferably a straight-chain or branched alkylene radical having 2 to 18 carbon atoms, preferably 2 to 4 carbon atoms, $R^2$ is hydrogen, alkyl having 1 to 8 carbon atoms, preferably 1 to 4 carbon atoms, or hydroxyalkyl having 1 to 8 carbon atoms, preferably 1 to 2 carbon atoms, in the alkyl radical, $R^3$ is selected from the same groups of residues as $R^2$, and $R^2$ and $R^3$ may also form a cyclic ring compound, preferably a 5-, 6- or 7-membered aliphatic ring, or, if $R^2$ is hydrogen, $R^3$ may also be a group of the formula

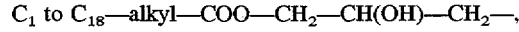

$C_1$ to $C_{18}$—alkyl—O—CH$_2$—CH(OH)—CH$_2$—,
NC—CH$_2$—CH$_2$— or
$C_1$ to $C_{18}$—alkyl—CHOH—CH$_2$—,
and A is a chemical bond or is —(R$^1$—NH)$_r$—R$^1$NH in which r is zero or an integer from 1 to 6 and R$^1$ is as defined above.

Examples of polyamines useful in the invention include poly-alkyleneamines, such as ethylenediamine, diethylenetriamine, triethylenetetramine, tetraethylenepentamine, pentaethylenehexamine, propylenediamine, dipropylenetriamine etc., and also 2,2,4- and/or 2,4,4-trimethylhexamethylenediamine, bis(3-aminopropyl)amine, N,N-bis(3-aminopropyl) ethylenediamine, neopentanediamine, 2-methyl-1,5-pentanediamine, 1,3-diaminopentane, hexamethylenediamine etc., and also cycloaliphatic amines such as 1,2- or 1,3-diaminocyclohexane, 1,4-diamino-3,6-diethylcyclohexane, 1,2-diamino-4-ethylcyclohexane, 1-cyclohexyl-3,4-diaminocyclohexane, isophoronediamine and reaction products thereof, 4,4'-diaminodicyclohexylmethane and -propane, 2,2-bis(4'-aminocyclohexyl)methane and -propane, 3,3'-dimethyl-4,4'-diaminodicyclohexylmethane, 3-amino-1-cyclohexylaminopropane, 1,4-bis(3-aminopropyl) piperazine, 1,3- and 1,4-bis(aminomethyl)cyclohexane.

Araliphatic amines which can be employed are, in particular, those in which aliphatic amino groups are present, for example meta- and para-xylylenediamine or hydrogenation products thereof.

Other suitable polyamines include amine-epoxy adducts, for example reaction products of polyamines, for example ethylenediamine, propylenediamine, hexamethylenediamine, 2,2,4- or 2,4,4-trimethylhexamethylenediamine, meta-xylylenediamine and/or bis(aminomethyl)cyclohexane with terminal mono- or polyepoxides, for example propylene oxide, hexene oxide or cyclohexene oxide, or with glycidyl ethers such as phenyl glycidyl ether, tert-butyl glycidyl ether, ethylhexyl glycidyl ether or butyl glycidyl ether, or with glycidyl esters, such as the glycidyl ester of ®Versatic acid marketed by Shell, Cardura® E, or the polyglycidyl ethers and esters specified below (for (C1)).

In addition to the above-mentioned polyamines, it also is possible to employ water-soluble polyoxyalkylenediamines and polyoxyalkylenepolyamines having molar masses of from 100 to 2000 g/mol, for example, the products marketed by Texaco under the trade name Jeffamine®, and the readily water-dispersible curing agents as described in DE-A 23 32 177 and EP-A 0 000 605. These useful polyamines include, for example, modified amine adducts. The polyamines can be used to increase the hydrophilicity and therefore the solubility or dispersibility of the aminourethanes in water or in aqueous amine curing agents.

The specified amines useful as compounds (C2) can be used alone or as mixtures. In any case the amines should be selected such that the end product contains preferably at least one, but particularly preferably, two or more free primary amino groups.

The compounds (C1) having at least one, and preferably at least two 2-oxo-1,3-dioxolane groups (=cyclic carbonate groups) can be obtained by reacting carbon dioxide with epoxy compounds in a known manner (see e.g. WO 84/03701, DE-A 3 529 263 and DE-A 3 600 602). The epoxy compounds preferably are polyglycidyl ethers based on polyhydric, preferably dihydric, alcohols, phenols, hydrogenation products of these phenols and/or on novolaks (reaction products of mono- or polyhydric phenols with aldehydes, especially formaldehyde, in the presence of acidic catalysts). The molar mass divided by the number of epoxy groups (epoxide equivalent masses) of these epoxy compounds preferably are between 100 and 2000 g/mol, in particular between 100 and 350 g/mol.

Examples of polyhydric phenols include resorcinol, hydroquinone, 2,2-bis(4'-hydroxyphenyl)propane (bisphenol A), isomer mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxybiphenyl, 4,4'-dihydroxybenzophenone,1, 1 -bis(4'-hydroxyphenyl) ethane2,2-bis[4'-(2"-hydroxypropoxy)phenyl]propane, 1,1-bis(4'-hydroxyphenyl)isobutane, 2,2-bis(4'-hydroxy-tert-butylphenyl)propane, bis(2-hydroxynaphthyl)methane, 1,5-dihydroxynaphthalene,tris(4-hydroxyphenyl)methane,bis(4-hydroxyphenyl) ether, bis(4-hydroxyphenyl) sulfone etc., and also the halogenation and hydrogenation products of the above-mentioned compounds. Bisphenol A is particularly preferred in this regard.

Examples of polyhydric alcohols include ethylene glycol, diethylene glycol, triethylene glycol, polyethylene glycols (n=4 to 35), 1,2-propylene glycol, polypropylene glycols (n=2 to 15), 1,3-propylene glycol, 1,4-butanediol, 1,5-pentanediol, 1,6-hexanediol, 1,2,6-hexanetriol, glycerol, neopentylglycol, trimethylolethane and trimethylolpropane. Polyethylene glycols (n=8 to 10) are particularly preferred in this regard.

The reaction of the polyamines (C2) with the cyclic carbonates (C1) preferably is carried out using stoichiometric ratios, and can be effected using conventional methods at elevated temperatures, if desired, with the use of inert solvents. Reaction in the presence of solvents which are inert toward the cyclocarbonate group is a preferred process variant. The basis for the stoichiometric evaluation of both the starting products and the end products, and for monitoring the reaction, is the amine number, (measured by titration with perchloric acid) and the cyclocarbonate equivalents number, (measured by titration with potassium hydroxide solution). The polyamine compounds can be employed individually or as mixtures, simultaneously or in chronological succession, and dissolved if desired in inert solvents.

With regard to the reaction, care should be taken to ensure that the reaction conditions and process conditions observed are those under which the cyclocarbonate groups of component (C1) can only react with the primary amino groups of the other component (C2). This can be achieved by known methods, without corresponding reactions also taking place with any secondary amino groups which may be present, which are considerably slower to react. In addition, excessively high temperatures should be avoided, in order to prevent the formation of cyclic urea derivatives from urethane structures of polyalkylenepolyamines. Those skilled in the art are capable of reacting compounds (C1) with compounds (C2) in the aforementioned manner using techniques known in the art.

Examples of suitable inert solvents for this reaction include aromatic hydrocarbons such as xylene and toluene, alcohols such as butanols and pentanols, and glycol ethers such as methoxyethanol, ethoxyethanol, methoxypropanol, butoxyethanol, methoxybutanol, glycol dimethyl ethers and diglycol dimethyl ethers and the like. The solvents to be chosen preferably are those which can be removed readily by distillation after the reaction has taken place or which do not interfere subsequently with the aqueous formulation. In the latter case the solvents should only be used in a quantity which is sufficient to lower the viscosity to a manageable level. Because of their potential reactivity with the reactive components, esters and ketones are of only limited suitability and should be tested in each individual case.

The reaction temperature typically can be within the range from 50° C. to 150° C., its lower limit being determined by solubility and viscosity and its upper limit by the tendency to produce secondary reactions and follow-on reactions and by the boiling point of the solvent. It is preferred to carry out the reaction at a temperature in the range of between 80° C. and 130° C. Catalysts are not required for this reaction. For instance, reactions between carbonates and primary amines proceed rapidly even at room temperature; however, relatively high temperatures are usually used for the systems described, since the products often have a high viscosity even in solution.

The relative proportions of (C1) and (C2) should preferably be chosen so as to form amino-functional reaction products which, via these functions, are able to react with amino-reactive functional groups, preferably with the glycidyl groups of an epoxy resin. These groups are preferably primary amino groups, of which at least one, but even more preferably, two or more, are present in one molecule of the aminourethane. By varying the proportions of components, it is possible to obtain products whose character ranges from oligomeric to polymeric, with oligomers being particularly preferred. It is therefore preferred to employ proportions of carbonate to polyamine which are in the region of about 1 mol of polyamine per mole of carbonate groups in the component.

The aminourethanes (C) obtained in this manner can preferably be employed, in combination with conventional aqueous amine curing agents (B), as curing and/or modifying agents for aqueous epoxy resin systems. Such amine curing agents, preferably for curing at room temperature and lower temperatures (amine cold curing agents), which are generally employed in a ratio of epoxide groups to amine hydrogen atoms of from 1:0.75 to 1:2.0, are all of the amines or Mannich bases and polyamidoamines which have already been mentioned above, which can be used alone or in the form of mixtures. Suitable Mannich bases can be prepared using known methods such as by condensation of polyamines, preferably diethylenetriamine, triethylenetetramine, isophoronediamine, 2,2,4- or 2,4,4-trimethylhexamethylenediamine, 1,3- and 1,4-bis (aminomethyl)cyclohexane, especially meta- and para-xylylenediamine, with aldehydes, preferably formaldehyde, and mono- or polyhydric phenols having at least one ring position which is reactive toward aldehydes, for example the various cresols and xylenols, para-tertbutylphenol, resorcinol, 4,4'-dihydroxydiphenylmethane or 4',4"-dihydroxy-2,2-diphenylpropane, but preferably phenol. Suitable polyamidoamines are obtained, for example, by reacting polyamines with mono- or polycarboxylic acids, for example, dimerized fatty acids.

Other suitable amine curing agents (B) which can be employed together with the aminourethanes include, in particular, the addition products of polyamines and (meth) acrylic acid derivatives, such as (meth)acrylonitrile, (meth) acrylic acid and $C_1$-$C_4$-alkyl esters thereof, and (meth) acrylamide. Addition products of this kind are described in EP-A 0 000 605. If the aminourethanes are used together with these addition products or with the above-mentioned amine curing agents, it may be advantageous also to use, in addition, the emulsifiers described in EP-A 0 000 605 and/or DE-A 43 10 198. These emulsifiers can be adducts of conventional polyepoxides and polyalkylene polyether polyols in a ratio of functional groups from 2:0.1 to 2:1.5. The additional use of these emulsifiers is advantageous when the binder system to be cured is an aqueous system. Determined by the ratio of functional groups as indicated above, the emulsifier contains free remaining epoxy groups. When such emulsifiers are used, this compound reacts with the aminourethane and/or with the other amine curing agents.

The quantity of emulsifier generally is from 20 to 80% by weight of the total quantity of emulsifier and all the curing agents, calculated as solids. Correspondingly, the total quantity of curing agent can be from 80 to 20%, in which context the ratio of emulsifier to curing agent should be chosen such that, in each case, free amino groups, preferably primary amino groups, are still present after the reaction of the emulsifier with the curing agent.

The modification according to the invention of liquid two-component systems, preferably aqueous epoxy/amine systems, with the aminourethanes known per se can be carried out in a variety of methods. A first method comprises employing the aminourethanes as an isolated compound either in pure form or in a solvent which is appropriate for the subsequent aqueous formulation. Examples of suitable solvents in this context are monoalcohols such as benzyl alcohol, ether alcohols such as methoxypropanol or isopropoxypropanol, and glycols such as methylglycol, butylglycol and butyldiglycol.

The procedure may be such that the aminourethane resin in pure form, for example as a powder, or in the form of a solvent, is mixed or homogenized with the aqueous amine curing agent, and this mixture is added to the epoxy resin component. However, it also is possible to add the aminourethane resin to the finished coating composition separately. Dissolved in a suitable form, the aminourethane can be added at any desired point during the preparation of the coating composition.

A second method comprises forming a chemical compound from the aminourethane resin and the aqueous amine curing agent, and adding this adduct as the amino component to the epoxy resin component. In this context, the chemical linking of aminourethane and amine curing agent is preferred over the mixture of aminourethane/amine curing agent or the separate addition of the aminourethane. This second method preferably is employed when, in addition to the aminourethane and further conventional aqueous amine curing agents, the amine component of the two-component system contains epoxy-containing emulsifiers of the type described above.

In turn, there are various possibilities for the chemical linkage of aminourethane and amine curing agent. For instance, the aminourethane can on the one hand be premixed with the other curing agents, and this mixture then chemically reacted with the emulsifier. A second variant comprises chemically reacting the aminourethane with the emulsifier and then adding the additional amine curing agent to the product. Conversely, it also is possible first to react chemically such additional amines with the emulsifier and then to admix the aminourethane. Finally, however, it is also possible first to react an amine mixture or amine curing agent mixture with a substoichiometric amount of compounds containing 2-oxo-1,3-dioxolane groups, and then to react this product with a substoichiometric amount of emulsifier, or to carry out this two-step reaction in reverse order.

In this context, care should be taken to ensure that the end product contains a sufficient number of free, preferably primary, amino groups. The reactions mentioned above preferably can be carried out in the absence of solvents, although in individual cases it may be entirely sensible to work in the presence of solvents, especially in order to adjust the viscosity to a favorable level. The reaction temperatures typically are in the range of from 20° to 90° C. The ratios of aminourethane curing agents to the conventional amine curing agents is generally in the range of between 95:5 and 5:95, preferably between 80:20 and 20:80 and particularly preferably between 70:30 and 30:70. These figures also apply when the above-mentioned emulsifier is used. Those skilled in the art are capable of reacting the aforementioned compounds using the methods described herein.

Epoxy resins preferably are employed as polyamine-crosslinking component (A) in the coating compositions according to the invention. These resins may be commercially available di- or polyepoxides. These are film-forming epoxy resins which are present as aqueous dispersion or as water-dilutable resin. Examples of such polyepoxides are polyglycidal ethers based on aliphatic or aromatic diols such as bisphenol A or bisphenol F, or polyalkylene glycols which are commercially available and known to those skilled in the art. Preferred compounds in this context are modified, nonionically stabilized epoxy resins based on aromatic diols, as described in, for example, DE-A 36 43 751.

The coating composition according to the invention comprises two different components: the polyamine-crosslinking component (A), preferably an epoxy resin, and the polyamine curing agent (B) which is modified with the aminourethane resin (C). Shortly before application, the two components are mixed in a ratio of amino groups to epoxy resins preferably of from 5:1 to 1:5, and more preferably from 1.5:1 to 1:1.5. In calculating this ratio, the amino groups of the aminourethane should also be taken into account.

The coating composition according to the invention can also contain conventional pigments and fillers, for example titanium dioxide, barium sulfate, aluminum silicate, silicon dioxide, zinc phosphate, carbon black and chromophoric and/or transparent organic or inorganic pigments, as well as conventional auxiliaries. Examples of the latter are anti-crater agents, antifoams, leveling agents, catalysts and adhesion promoters. The coating composition may also contain organic solvents, the contents of which should preferably be below 10% by weight.

Suitable pigments and/or fillers may be dispersed either in the epoxy resin component or in the amine component. Their dispersion in the amine component is preferred. Those skilled in the art are capable of dispersing pigments and/or fillers in the epoxy resin using techniques known in the art.

It is advantageous for the coating compositions according to the invention, especially aqueous coating compositions based on epoxide/amine, to contain one or more water-dilutable or water-soluble polyurethane resins having a number-average molar mass ($M_n$) of 500–500,000 g/mol, in order to achieve surfaces which are free from defects. The use of 5–80% by weight of the polyurethane resin, based on the resin solids content of epoxy resin and polyamine curing agent, also is advantageous in the coating composition. The polyurethane resin may be contained either in the epoxy component, in the polyamine component or in both components. The aqueous polyurethane resin may be ionically or nonionically stabilized. Examples of such polyurethane resins are described in DE-A 41 23 860.

In order to improve the properties it is also possible, instead of the polyurethane resins, to add one or more water-soluble or water-dilutable acrylate resins. Such polyacrylate resins have, for example, a number-average molar mass ($M_n$) of 500–200,000 g/mol. They are preferably acrylate copolymers, with conventional water-soluble or water-dilutable polyacrylate resins being appropriate. Examples of these are described in EP-A 0 358 979.

The coating compositions according to the invention can be applied by conventional methods, such as dipping, rolling, brushing and spraying. Crosslinking can be carried out at temperatures of 20°–120° C., but preferably at temperatures below 80° C.

After crosslinking, homogeneously coated substrates with smooth, defect-free surfaces are obtained. In comparison with known aqueous epoxy/polyamine systems, the coating compositions according to the invention show a considerable reduction in thermoplasticity, leading to a marked improvement in sandability. After just a short drying time the coatings can be wet- and dry-sanded.

A further advantage of the coating compositions according to the invention is the very good adhesion to the substrate, even in thin coats, and in a very good wet adhesion to, for example, zinc, iron, steel, aluminum and glass fiber-reinforced plastics.

The coating composition according to the invention can be used for coating a variety of substrates, for example metal, plastic, wood, glass and mineral substrates. A preferred application of the coating compositions is in the sector of automotive finishing and the coating of automotive components. In this context the coating compositions are preferably applied as filler coats and/or primer coats.

The examples which follow are intended to illustrate the invention in more detail.

EXAMPLES

Example 1

Preparation of an aminourethane 1

BDC (916 g, the product of reaction of the diglycidyl ether of bisphenol A with carbon dioxide, until complete disappearance of the epoxide groups) was heated to 120° C. together with 120 g of methylglycol, and maintained at this temperature with thorough stirring. To the resulting solution, which soon became almost clear, 103 g of diethylenetriamine (DETA) were first added at 100° C. and reaction was carried out to an amine number of 39 mg of KOH/g. Reaction was then continued with 120 g of ethylenediamine up to an amine number of 106 mg of KOH/g. Following removal of volatile compounds by distillation, 1176 g of product remained, with an amine number of 116 mg of KOH/g and 22% residual solvent.

The melting point of the product was below room temperature.

Example 2

Preparation of an aminourethane 2

BDC (229 g) was heated to 120° C. together with 120 g of methylglycol, and maintained at this temperature with thorough stirring. The resulting solution was reacted with 103 g of DETA until an amine number of 171 mg of KOH/g was reached. After removal of volatile compounds by distillation, 420 g of product remained, having an amine number of 203 mg of KOH/g, 1.5% residual solvent and a melting point of 42° C.

Example 3

Preparation of a chemically integrated aminourethane 3

A solution of 229 g of BDC in 95 g of butylglycol was reacted first with 25.8 g of diethylenetriamine up to an amine number of 34 mg of KOH/g, and then reacted further with 30 g of ethylenediamine until an amine number of 106 mg of KOH/g was reached. This resulted in 380 g of product being obtained, having an amine number of 102 mg of KOH/g, containing 25% butylglycol and being highly viscous at room temperature.

The resulting product (131.6 g) was heated to 70° C. together with 43.8 g of isophoronediamine and 35.2 g of m-xylylenediamine, with thorough stirring. The mixture, which was now clear and had an amine number of 95 mg of KOH/g, was reacted with 155.2 g of an epoxy-functional emulsifier as described in DE 43 10 198 (Exp. 1.4), the reaction being considerably exothermic. The mixture, which was still clear, was adjusted to a solids content of 80% using 59 g of water and had an amine number of 166 mg of KOH/g and a viscosity of about 28,000 mPas (25° C.). The product contained 7.8% butylglycol.

Example 4

Preparation of a filler 1

Aminourethane 1 (19 g), corresponding to Example 1, 23 g of a commercially available polyamine (80% in water, Beckopox VEM 2133W from Hoechst AG) and 350 g of fully deionized water were mixed thoroughly with one another. A commercially available polyurethane thickener (13 g) and 1.3 g of a corrosion inhibitor were added to the mixture, and were likewise mixed in thoroughly. The following pigments and fillers were dispersed in this mixture in a conventional manner:

32 g of silicon dioxide
114 g of barium sulfate
95 g of aluminum silicate
104 g of titanium dioxide
5 g of yellow iron oxide.

A commercially available nonionic polyurethane dispersion (123 g, solids content 40%, ZB 2081 UZ from DSM) was added to the resulting mixture, and intensive stirring was carried out. Shortly before application, 243 g of a commercial aqueous epoxy resin (50%, ®Beckopox EP 384W from Hoechst AG) were added, and the two components were intensively mixed by stirring.

Example 5

Preparation of a filler 2

Aminourethane 2 (27 g), corresponding to Example 2, 25 g of a commercial polyamine (80% in water, Beckopox VEM 2133W from Hoechst AG) and 336 g of fully deionized water were mixed thoroughly with one another. A commercial polyurethane thickener (13 g) and 1.3 g of a corrosion inhibitor are added to the mixture, and were likewise mixed in thoroughly. The following pigments and fillers were dispersed in this mixture in a conventional manner:

32 g of silicon dioxide
114 g of barium sulfate
95 g of aluminum silicate
104 g of titanium dioxide
5 g of yellow iron oxide.

Shortly before application of the resulting polyamine component, 243 g of a commercial aqueous epoxy resin (50%, EP 384) were added, and the two components were mixed intensively by stirring.

Example 6

Preparation of a filler 3

Aminourethane 3 (48.5 g.), corresponding to Example 3, and 350 g of fully deionized water were thoroughly mixed with one another. A commercial polyurethane thickener (13 g) and 1.3 g of a corrosion inhibitor were added to the mixture and were likewise mixed in thoroughly. The following pigments and fillers were dispersed in this mixture in a conventional manner:

32 g of silicon dioxide
114 g of barium sulfate
95 g of aluminum silicate
104 g of titanium dioxide
5 g of yellow iron oxide.

Shortly before application, 238 g of a commercial aqueous epoxy resin (50%, ®Beckopox EP 384 from Hoechst AG) were added to the resulting polyamine component, and the two components were mixed intensively by stirring.

Example 7 (comparative example)

Preparation of a filler 4

The polyamine component was prepared in analogy to Example 4, except that 37 g of the commercially available polyamine curing agent were mixed with 334 g of fully deionized water without the addition of aminourethane. As epoxy component, 262 g of a commercial aqueous epoxy resin (50% Beckopox, EP 384) were added shortly prior to application, and the two components were mixed intensively by stirring.

Example 8

Preparation of a primer 1

Aminourethane 1 (15 g), corresponding to Example 1, 283 g of fully deionized water and 46 g of a commercial polyamine (80% in water Beckopox, VEH 2133) were mixed thoroughly with one another. A commercially available polyurethane thickener (7 g) and 10 g of a commercially available siccative were added to the mixture and were likewise mixed in thoroughly. The following pigments and fillers were dispersed in this mixture in a conventional manner:

10 g of silicic acid
70 g of a zinc-containing anticorrosion pigment
30 g of CaCO$_3$
78 g of talc
60 g of yellow iron oxide.

A commercial aqueous epoxy resin (390 g. Beckopox, VEP 2385, 57%) were added shortly prior to application, and the two components were mixed intensively by stirring.

Example 9

Preparation of a primer 2 (Comparison)

The procedure of Example 8 was followed, except that 57 g of the commercially available polyamine and 280 g of fully deionized water were mixed with one another, without the addition of aminourethane. As the epoxy component, 399 g of a commercial epoxy resin (®Beckopox VEP 2385 from Hoechst AG, 57%) were added shortly before application, and the two components were mixed intensively with one another.

Application of the coating compositions

The filler-coating compositions were each applied by spraying to steel substrates coated beforehand with a cataphoretic primer and were dried at 60° C. for ½ hour. The primer-coating compositions were each applied to steel, zinc and aluminum substrates and were dried at 20° C. for 15 minutes. The properties of the resulting coatings are summarized in the table below.

As can be seen from the table below, only the inventive fillers and primer compositions exhibited very good wet and dry sanding after relatively short drying times (15 minutes–30 minutes).

| Coat thickness in μm | Filler 1 30/130 | Filler 2 30/130 | Filler 3 30/130 | Filler 4 (comparison) 30/60 | Primer 1 | Primer 2 (comparison) |
|---|---|---|---|---|---|---|
| Wet sanding | ++/++ | ++/++ | ++/++ | +/− | | |
| Dry sanding | ++/++ | ++/++ | ++/++ | +/− | | |
| Adhesion to: | | | | | | |
| steel | | | | | + | + |
| zinc | | | | | + | − |
| aluminum | | | | | + | − |
| GrP | | | | | + | − |

++ very good
+ good
− poor
— very poor
GrP: Glass fiber-reinforced plastic

While the invention has been described in detail by reference to particularly preferred embodiments and examples, those skilled in the art recognize that various modifications can be made without significantly departing from the spirit and scope thereof. In addition, the disclosures of all of the aforementioned documents are incorporated by reference herein in their entirety.

What is claimed is:

1. A process for the production of a coating composition which is crosslinkable at room temperature, comprising the steps of (i) applying a layer of a coating composition comprising:

A) one or more resins having amino-reactive groups;
    B) one or more polyamine curing agents;
    C) one or more aminourethanes comprising reaction products of
        C1) oligomeric or polymeric compounds which contain at least one terminal 2-oxo-1,3-dioxolane groups (cyclic carbonate groups), and
        C2) amines containing at least one primary amino group, the ratio of numbers of functional groups in C1) and C2) being from 1:1 to 1:10; and
    D) optionally, pigments, fillers, one or more organic solvents, water and conventional additives to a substrate, wherein a chemical compound is formed from a reaction between the aminourethane C) and the polyamine curing agent B) prior to the following step (ii) and
    (ii) curing the coating layer, wherein said reaction between said aminourethane C) and said polyamine curing agent B) is selected from the group consisting of
        (a) mixing the aminourethane C) with the polyamine curing agent B), and then reacting this mixture with an emulsifier D);
        (b) reacting the aminourethane C) with an emulsifier D), and then adding the amine curing agent B); and
        (c) reacting the amine curing agent B) with an emulsifier D), and then adding the aminourethane C), wherein the emulsifier D) is an adduct of polyepoxides and polyalkylene ether polyols in a ratio of numbers of functional groups of from 2:0.1 to 2:1.5.

2. The process as claimed in claim 1, wherein said reaction between said aminourethane C) and said polyamine curing agent B) comprises the steps of:

1) mixing said aminourethane C) and said polyamine curing agent B) to produce a mixture, and;
    2) reacting said mixture with said emulsifier.

3. The process as claimed in claim 1, wherein said reaction between said aminourethane C) and said polyamine curing agent B) comprises the steps of:

1) reacting said aminourethane C) with said emulsifier to produce a reaction product; and
    2) mixing said polyamine curing agent with said reaction product.

4. The process as claimed in claim 1, wherein said reaction between said aminourethane C) and said polyamine curing agent B) comprises the steps of:

1) reacting said polyamine curing agent B) with said emulsifier to produce an amine reaction product; and
    2) mixing said aminourethane C) with said amine reaction product.

* * * * *